(12) United States Patent
Mueller et al.

(10) Patent No.: US 9,652,201 B2
(45) Date of Patent: May 16, 2017

(54) METHODS AND SYSTEMS FOR PHYSICALLY-BASED RUNTIME EFFECTS

(75) Inventors: Eric Mueller, Fremont, CA (US); Anthony Mowatt, Emeryville, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1211 days.

(21) Appl. No.: 13/249,392

(22) Filed: Sep. 30, 2011

(65) Prior Publication Data

US 2014/0289703 A1    Sep. 25, 2014

Related U.S. Application Data

(60) Provisional application No. 61/388,767, filed on Oct. 1, 2010.

(51) Int. Cl.
*G06F 9/44* (2006.01)

(52) U.S. Cl.
CPC ........ *G06F 8/30* (2013.01); *A63F 2300/6607* (2013.01)

(58) Field of Classification Search
CPC .......... G06T 13/00; G06T 13/40; G06F 3/048
See application file for complete search history.

(56) References Cited

U.S. PATENT DOCUMENTS

| | | | | |
|---|---|---|---|---|
| 5,909,218 A * | 6/1999 | Naka et al. | .................... | 345/419 |
| 6,057,859 A * | 5/2000 | Handelman et al. | ......... | 345/474 |
| 6,141,019 A * | 10/2000 | Roseborough et al. | ...... | 345/473 |
| 6,285,380 B1 * | 9/2001 | Perlin et al. | ................... | 345/473 |
| 6,400,368 B1 * | 6/2002 | Laperriere | .................... | 345/473 |
| 7,403,202 B1 * | 7/2008 | Nash | ............................. | 345/474 |
| 8,228,336 B1 * | 7/2012 | Dykes | ........................... | 345/473 |
| 8,554,526 B2 * | 10/2013 | Andersen et al. | ................ | 703/6 |
| 8,683,429 B2 * | 3/2014 | Mueller | ....................... | 717/108 |
| 2004/0148268 A1* | 7/2004 | Reil | .............................. | 706/904 |
| 2005/0225552 A1* | 10/2005 | Anand | .......................... | 345/473 |
| 2005/0253846 A1* | 11/2005 | Russ et al. | .................... | 345/473 |
| 2006/0106494 A1* | 5/2006 | Alvarez et al. | ............... | 700/251 |
| 2006/0109274 A1* | 5/2006 | Alvarez et al. | ............... | 345/473 |

(Continued)

OTHER PUBLICATIONS

Milbourne, Paul; Oliver, Michael; Kaplan, Chris; "The Essential Guide to Flash CS4 with ActionScript", 1st Edition, published Mar. 11, 2009, publisher friendsofED, Chapters 1-2, 7, 12, and 18-19, 157 pages.*

(Continued)

*Primary Examiner* — Maurice L McDowell, Jr.
(74) *Attorney, Agent, or Firm* — Kilpatrick Townsend & Stockton LLP

(57) ABSTRACT

One exemplary embodiment involves receiving input defining an inverse kinematics hierarchy for an object to be displayed in an application under development. The exemplary embodiment further involves receiving input indicating a physical parameter applicable to the inverse kinematics hierarchy. The exemplary embodiment further involves producing a package defining the application under development. The package comprises a description of the physical parameter and code that, when executed or interpreted, provides a physics engine configured to calculate a physical response of at least a portion of the inverse kinematics hierarchy using the description of the physical parameter.

20 Claims, 5 Drawing Sheets

(56) References Cited

U.S. PATENT DOCUMENTS

| | | | | |
|---|---|---|---|---|
| 2006/0125799 | A1* | 6/2006 | Hillis et al. | 345/173 |
| 2006/0221081 | A1* | 10/2006 | Cohen | G06T 13/00 |
| | | | | 345/473 |
| 2006/0256130 | A1* | 11/2006 | Gonzalez | 345/619 |
| 2006/0274070 | A1* | 12/2006 | Herman et al. | 345/474 |
| 2008/0021679 | A1* | 1/2008 | Bleiweiss et al. | 703/2 |
| 2008/0055321 | A1* | 3/2008 | Koduri | 345/505 |
| 2008/0120113 | A1* | 5/2008 | Loyall et al. | 704/270 |
| 2009/0091563 | A1* | 4/2009 | Viz et al. | 345/419 |
| 2009/0307623 | A1* | 12/2009 | Agarawala et al. | 715/765 |
| 2010/0118034 | A1* | 5/2010 | Kim | G06T 13/00 |
| | | | | 345/473 |
| 2010/0134501 | A1* | 6/2010 | Lowe et al. | 345/474 |
| 2011/0099492 | A1* | 4/2011 | Park et al. | 715/764 |
| 2011/0267358 | A1* | 11/2011 | Rennuit | G06T 13/40 |
| | | | | 345/474 |

OTHER PUBLICATIONS

Brubaker, M., Leonid Sigal, and David J. Fleet. "Physics-based Human Motion Modeling for People Tracking: A Short Tutorial." Image (Rochester, NY) (Sep. 29, 2009), pp. 1-48.*

Faloutsos, Petros, Michiel Van de Panne, and Demetri Terzopoulos, "Composable controllers for physics-based character animation," Proceedings of the 28th annual conference on Computer graphics and interactive techniques, pp. 251-260, ACM, 2001.*

Hahn, James K., "Realistic animation of rigid bodies," ACM SIGGRAPH Computer Graphics, vol. 22, No. 4, ACM, 1988.*

Chris Maraffi, "Softimage® IXSITM Character Animation f/x & Design", © 2001, chapters 1,4 and 5, Published by Coriolis Group Books (Dec. 18, 2000), 79 pages.*

Peters, Keith, "Foundation ActionScript 3.0 Animation: Making Things Move!", Apress (Apr. 2007), specifically Chapters 6, 9-10 and 14, 101 pages.*

Arjan J. F. Kok, Robert van Liere, "A multimodal virtual reality interface for 3D interaction with VTK", Knowledge and Information Systems, vol. 13, No. 2, pp. 197-219, published online Feb. 8, 2007.*

Zoran Popović; and Andrew Witkin, Aug. 8-13, 1999, "Physically based motion transformation", Proceedings of the 26th annual conference on Computer graphics and interactive techniques (SIGGRAPH '99), ACM Press/Addison-Wesley Publishing Co., New York, NY, USA, pp. 11-20.*

Rennuit, Antoine, et al. "Passive control architecture for virtual humans," 2005 IEEE/RSJ International Conference on Intelligent Robots and Systems, (IROS 2005), IEEE, 6 pages.*

Russell Smith, Open Dynamics Engine, vO.5 User Guide, Feb. 23, 2006, www.ode.org, 70 pages.*

Emanuelle Feronato, "APE—Actionscript Physics Engine Tutorial," Oct. 23, 2007, parts 1 and 2 retrieved from: http://www.emanueleferonato.com/2007/10/14/ape-actionscript-physics-engine-tutorial/ and http://www.emanueleferonato.com/2007/10/23/ape-actionscript-physics-engine-tutorial-part-2/.*

Chris Georgenes, "Character animation with the Bone tool in Flash," Adobe Developer Connection/Flash Developer Center, created Dec. 6, 2009, retrieved from: http://www.adobe.com/devnet/flash/articles/character_animation_ik.html.*

Anonymous, "Physics Engines", defined, MIT Scratch Wiki, retrieved from: http://wiki.scratch.mit.edu/wiki/Physics_Engines.*

Anonymous, "Programming", defined, MIT Scratch Wiki, retirieved from: http://wiki.scratch.mit.edu/wiki/Programming.*

* cited by examiner

METHODS AND SYSTEMS FOR PHYSICALLY-BASED RUNTIME EFFECTS

CROSS REFERENCE TO RELATED APPLICATION

This application claims priority to U.S. Provisional Patent Application No. 61/388,767, filed on Oct. 1, 2010, entitled "METHODS AND SYSTEMS FOR PHYSICALLY-BASED RUNTIME EFFECTS," the disclosure of which is hereby incorporated by reference in its entirety for all purposes.

FIELD

This disclosure relates generally to computer software and more particularly relates to the creation, modification, use, and distribution of electronic content.

BACKGROUND

Digital content often includes moving objects. For example, animated characters or scene elements can be used to engage a user of an application or simply to provide entertainment. Users expect moving objects to behave according to some sort of physics, whether a simulation of real-world physics or in some other way. This may be challenging to developers, who may lack the expertise and/or time to expressly animate physical responses.

SUMMARY

One exemplary embodiment involves receiving input defining an inverse kinematics hierarchy for an object to be displayed in an application under development. The exemplary embodiment further involves receiving input indicating a physical parameter applicable to the inverse kinematics hierarchy. The exemplary embodiment further involves producing a package defining the application under development. The package comprises a description of the physical parameter and code that, when executed or interpreted, provides a physics engine configured to calculate a physical response of at least a portion of the inverse kinematics hierarchy using the description of the physical parameter.

These illustrative features are mentioned not to limit or define the disclosure, but to provide examples to aid understanding thereof. Additional embodiments are discussed in the Detailed Description, and further description is provided there. Advantages offered by one or more of the various embodiments may be further understood by examining this specification or by practicing one or more embodiments presented.

BRIEF DESCRIPTION OF THE FIGURES

These and other features, aspects, and advantages of the present disclosure are better understood when the following Detailed Description is read with reference to the accompanying drawings, where:

FIG. 2b illustrates a simplified example of an inverse kinematics model for the alien creature of FIG. 2a;

DETAILED DESCRIPTION

Methods, systems, and computer-readable media are discussed below that allow a developer to provide for objects in an application that respond at runtime according to a physical model without the need to expressly animate such responses during development. Instead, a development tool can allow the developer to define an inverse kinematics hierarchy that governs how objects and portions thereof are arranged. The developer may also provide physical parameters applicable to the inverse kinematics hierarchy. When the application under development is packaged for distribution, the development tool can include a description of the physical parameters along with suitable code that, when executed, provides a physics engine. The object(s) may be moved at runtime, either according to movement that was specified at development time and/or in response to user input. When the object(s) are moved at runtime, the physics engine can be used to provide feedback, such as by calculating responsive forces applied to one or more portions of the inverse kinematics hierarchy. Depending upon the physical parameters, the responsive forces may result in additional movement of the object(s) and/or resistance to movement.

Reference will now be made in detail to various and alternative exemplary embodiments and to the accompanying drawings. Each example is provided by way of explanation, and not as a limitation. It will be apparent to those skilled in the art that modifications and variations can be made. For instance, features illustrated or described as part of one embodiment may be used on another embodiment to yield a still further embodiment.

In the following detailed description, numerous specific details are set forth to provide a thorough understanding of the subject matter. However, it will be understood by those skilled in the art that the subject matter may be practiced without these specific details. In other instances, methods, apparatuses or systems that would be known by one of ordinary skill have not been described in detail so as not to obscure the subject matter.

Figure 1:
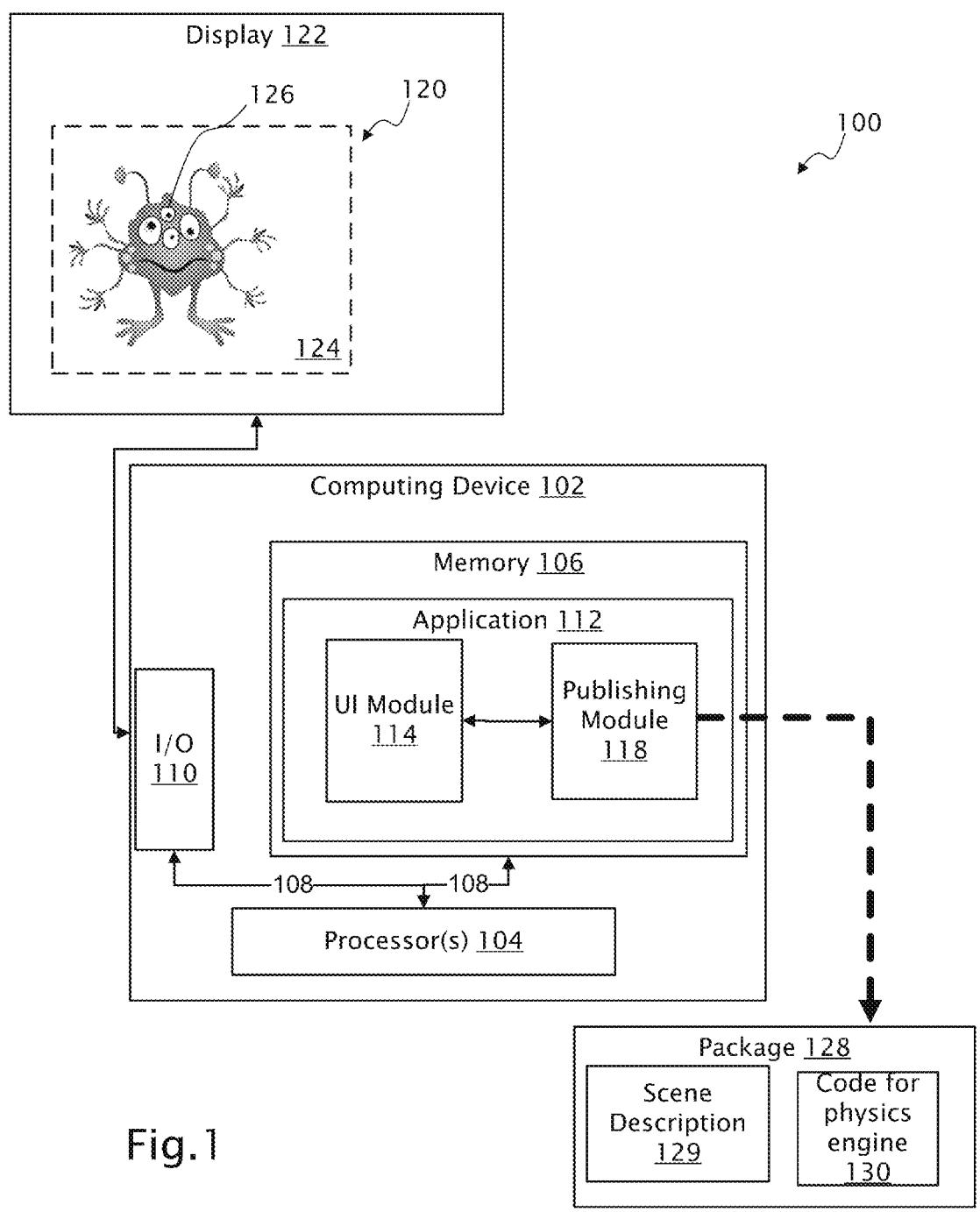
FIG. 1 is a diagram of an illustrative development system comprising a computing device.

FIG. 1 is a diagram of an illustrative development system 100 comprising a computing device 102. For example, device 102 may comprise a desktop, laptop, or other computer, or a mobile device, a tablet computer, a phone, an e-book reader, or other computing system (e.g., kiosk, set-top box, television, gaming system, etc.). In this example, computing device 102 comprises a processor 104 and memory 106 linked by one or more busses 108 or other suitable interconnection(s). Memory 106 may comprise RAM, ROM, or other memory accessible by processor 104, and the memory space accessible by processor 104 may include other storage (e.g., hard disk, optical disk, networked storage, etc.).

I/O interfaces 110 represent various components used by processor 104 to provide and access data from resources outside of device 102. For example, interface(s) 110 may comprise a graphics interface (e.g., VGA, HDMI) to which a display is connected, a USB or other interface to which a keyboard, mouse, touch screen, or other input device is connected. Interface(s) 110 may also comprise a networking component for communicating via wired or wireless communication, such as via Ethernet, IEEE 802.11 (Wi-Fi), 802.16 (Wi-Max), Bluetooth, infrared, etc. As another example, the networking component may allow for communication over communication networks, such as CDMA, GSM, UMTS, or other cellular communication networks.

In this example, computing device 102 utilizes a development application 112 that can be used to develop a runtime application package. Examples of runtime application packages include, but are not limited to, applications executable using ADOBE(R) FLASH(R) or AIR(R), available from Adobe Systems Incorporated of San Jose, Calif. An example of a development application 112 is FLASH(R) PRO(R), also available from Adobe Systems Incorporated, but modified in accordance with the present subject matter to generate applications that provide physics-based effects at runtime. Development application 112 is shown here as a client-side application, but it will be understood that application 112 could be provided as a web service, such as by including a client-side front end that communicates with server-side publishing logic.

In this example, development application 112 includes a UI module 114 and a publishing module 118. UI module 114 configures computing device 102 to provide output to render a graphical user interface 120 on display 122, which may comprise one or more LCD or other display units. Graphical user interface 120 includes a design canvas or other area that allows a user to specify a scene 124. In practice, scene 124 may be specified through user input via a keyboard, mouse, touch input, and/or other devices (not shown). Development application 112 may provide a user interface providing toolbars, menu items, and other selectable inputs whereby the user can specify the contents of the scene 124.

The runtime application may be developed by arranging one or more scenes 124 to indicate a desired visual output to be provided by the runtime application. In this example, the output of the application under design will include an alien creature 126. Alien creature 126 may be animated by specifying locations to which creature 126 is to move, such as by indicating a path for creature 126 to follow over time. Other elements of the application under design can include a background, interface elements (text boxes, links, other controls), etc. The developer(s) of the runtime application may specify these elements in any suitable way, such as dragging corresponding elements to the design canvas and indicating desired locations and behaviors of those elements.

Figure 2A:
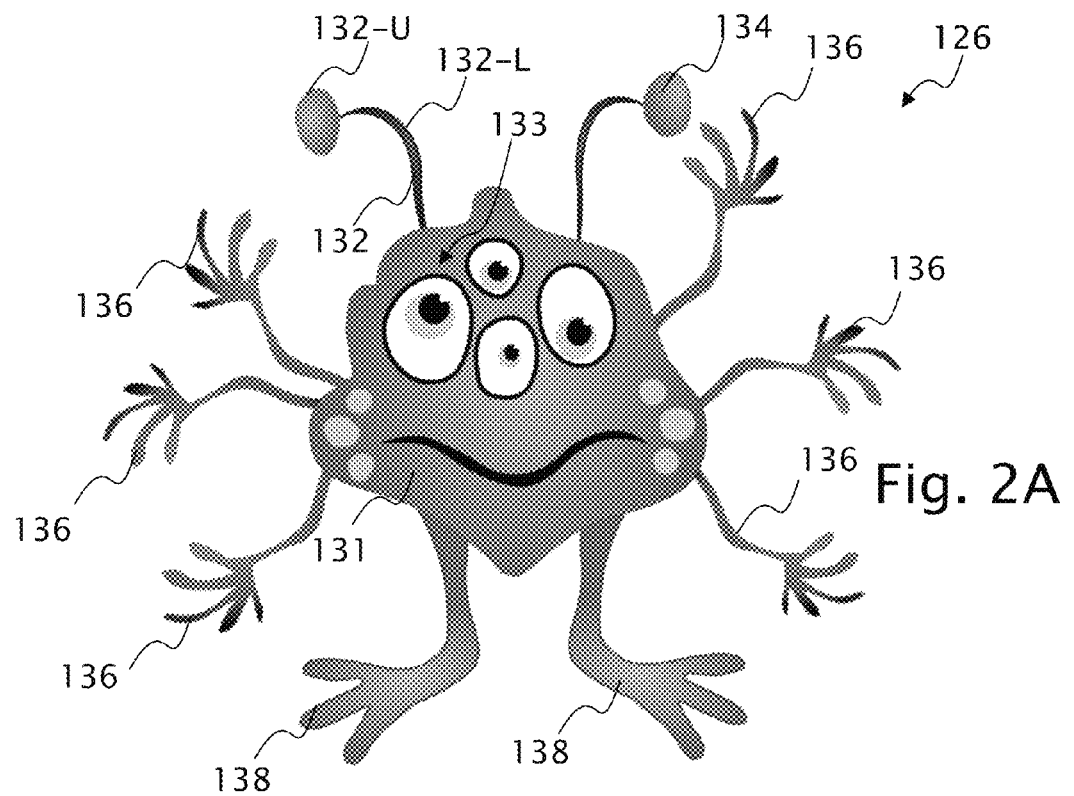
FIG. 2a illustrates an exemplary alien creature element specified using a plurality of objects.

In practice, an element such as alien creature 126 may be specified using a plurality of objects. Turning to FIG. 2A, alien creature 126 is shown in closer detail. In this example, the creature is comprised of a main body 131 and facial features 133. Two antennae 132 and 134 are provided, along with several arms 136 and two legs 138. Each part of alien creature 126 may be a separate object, such as a separate vector graphics object. For example, the body parts may each comprise vector or other graphics, or another representation of the desired visual characteristics of the creature. In practice, each part may itself be a collection of sub-objects (for example, facial features 133 may comprise a plurality of eye objects, each eye object may include a plurality of objects for the pupil, whites of the eye, etc.).

The development application may support the use of inverse kinematics whereby scene components, such as alien creature 126, may be represented as having a plurality of "bones" and "joints." Corresponding objects (e.g., the skin or other element(s) representing the rendered appearance of the respective arm, leg, antenna, etc.) are linked to the bone. Thus, alien creature 126 may be moved by specifying a desired location for one portion (e.g., an arm 136) and, based on the inverse kinematics model, the remaining portions of alien creature 126 will be moved accordingly.

Figure 2B:
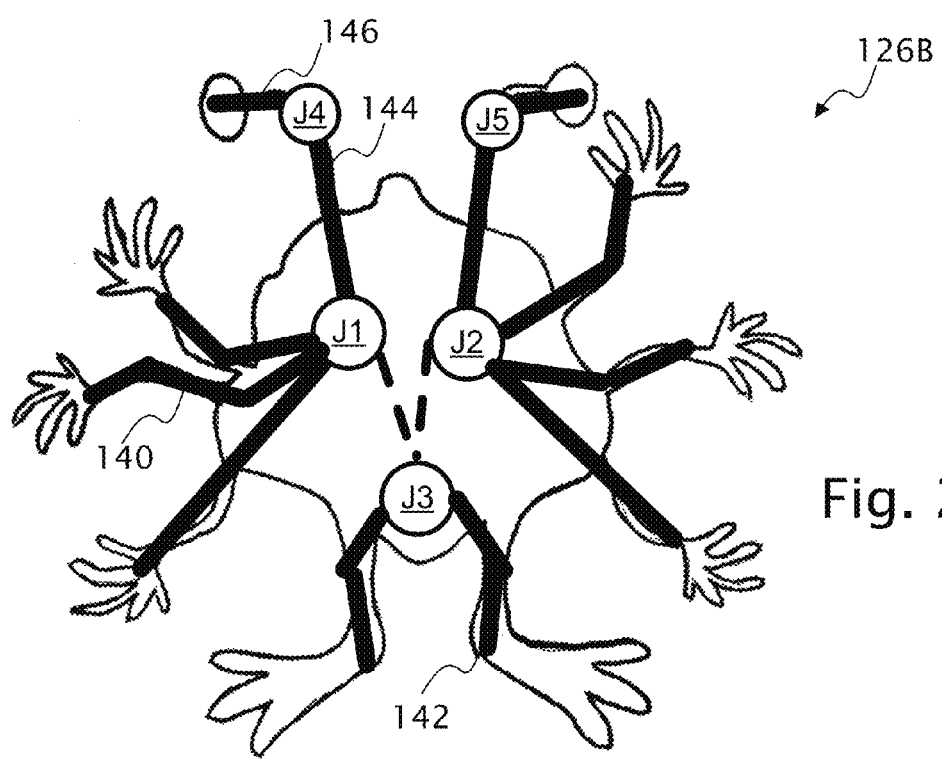

A simplified example of an inverse kinematics model for alien creature 126 is shown in FIG. 2B. As can be seen here, the bones are illustrated as heavy lines connected to joints J1, J2, J3, J4, and J5. In particular, each arm has a bone assembly 140 linked to one of joints J1 or J2. Each leg has a bone assembly 142 linked to joint J3. In practice some or all of arms 140 and legs 142 may be articulated, with multiple joints and bone segments. As an example of articulation, antennae 132 and 134 are represented using lower segments (e.g., segment 144 corresponding to lower antenna part 132-L) linked between joint J1 and J4 (or J2 and J5) and an upper segment (e.g., segment 146 corresponding to upper antenna part 132-U).

In this example, joints J1, J2, and J3 can be joined to one another or a central joint (not shown) so that alien creature 126 can be manipulated as a single unit according to the inverse kinematics model. Facial features 133 may also be specified as part of the model but are not illustrated in FIG. 2B to simplify the illustration. More generally, one or more inverse kinematics hierarchies may be specified—e.g., a model for the creature's hands, linked to a model for each arm, linked to a model for the entire body, etc.

In addition to allowing the developer to specify the bones and joints of the inverse kinematics model, development application 112 can provide an option for the developer to indicate that the application being developed is to support physically-based behavior for one or more of the inverse kinematics hierarchies at runtime. If the developer selects such an option, UI module 114 can provide a suitable interface for the developer to specify physical properties, such as weights, volume, density of bones or other constituent elements of the inverse kinematics model and properties such as spring constants, damping, and the like that govern how the bones or other constituent elements interact with one another. Development application 112 can then produce a runtime package 128 including a description 129 of the properties and code 130 that, when executed, causes the corresponding portions of the object(s) in the runtime application to respond according to the physical properties.

Figure 3:
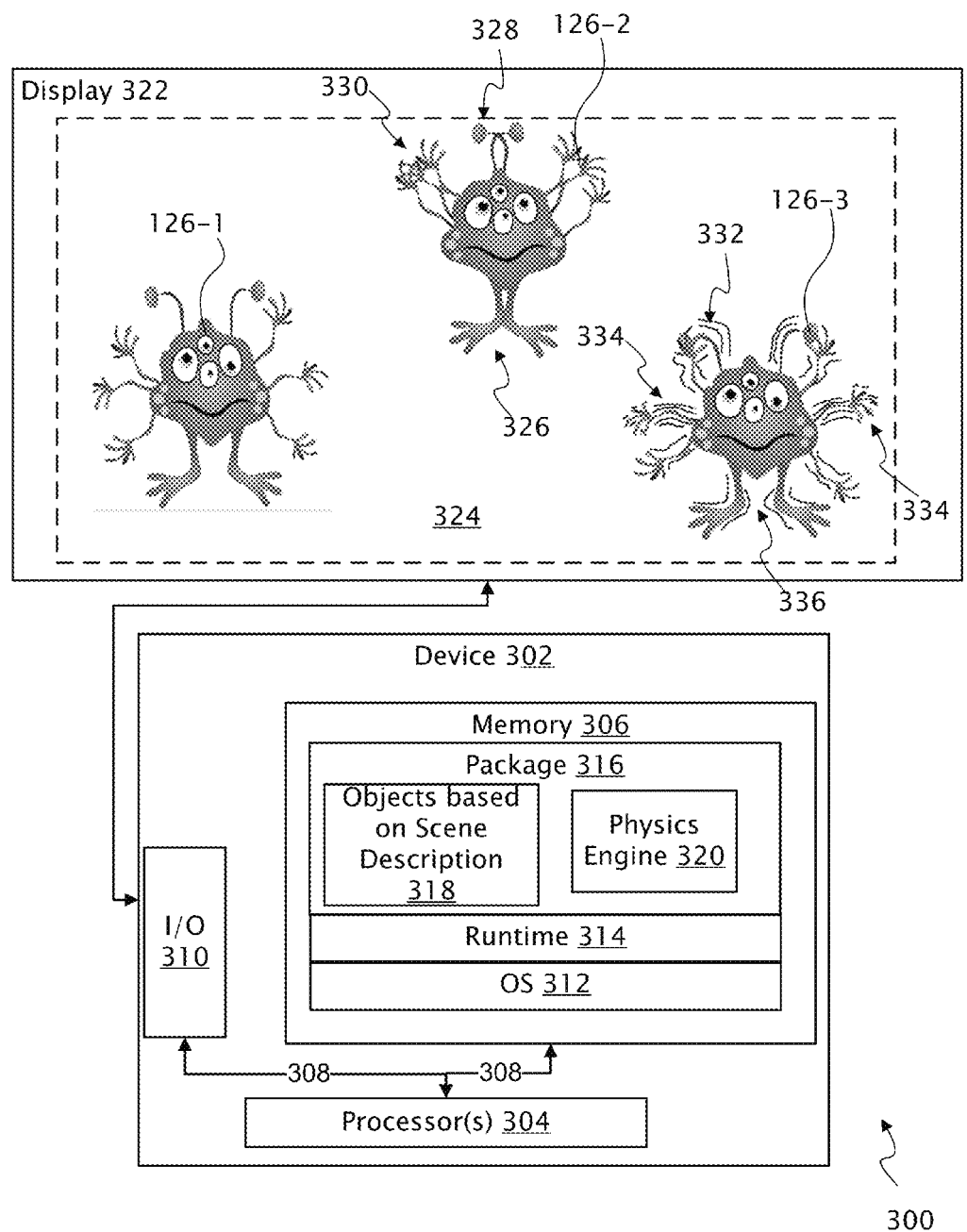
FIG. 3 is an example of a system executing a runtime package with objects that respond according to specified physical properties.

FIG. 3 is an example of a system 300 executing such a runtime package. In this example, a computing device 302 includes processor(s) 304, memory 306, bus 308, I/O components 310, and may generally represent any suitable computing device. Device 302 may be the same as or different from device 102 used to develop runtime application packages. In this example, memory 306 includes an operating system 312, a runtime environment 314, and a runtime application package 316 produced by a development application such as development application 112.

As shown here, runtime application package 316 includes a set of objects based on scene description 318 and physics engine 320. The package may include scripting data in some embodiments, but scripting is not necessary to provide the physically-based effects in accordance with the present subject matter.

For instance, runtime application package 316 may be downloaded or otherwise accessed as a Small Web Format ("SWF") or other file. The file can include an eXtensible Markup Language ("XML") scene description identifying the objects to be rendered in scene 324 using display 322 and suitable algorithms to generate physics engine 320. When runtime application package 316 is executed, suitable objects can be instantiated and used to render scenes as specified in the runtime application package. The objects can include physical properties or an object containing physical properties can be maintained in memory. Physics engine 320 is utilized to provide responses based on physical properties included by the development application in scene description 318. When objects move (either in response to code of application package 316, such as code moving the objects or in response to input or other events at runtime), physics engine 320 can be used to provide appropriate responses according to the kinematics model and physical properties.

In this example, runtime application package 316 includes data that causes computing device 302 to render scene 324 featuring alien creature 326. According to scripting data or other code of package 316, alien creature 126 moves from an initial position 126-1 to collide with the top of scene 324 as shown at 126-2. Then, the creature moves downward to collide with the bottom of the scene as shown at 126-3. Viewed at runtime, creature 126 would appear once and, while moving left-to-right, move to the top and back to the bottom of the screen.

In accordance with the present subject matter, creature 126 has been specified using an inverse kinematics model with runtime-based physical properties. For example, the physical properties may have been specified with respect to various bones and joints J1-J5 of FIG. 2B. Accordingly, when the creature moves upward to collide with the top of the scene as shown at 126-2, its legs fall together as shown at 326, its antennae collide as shown at 328, and its arms move upward in response to the jolt. Then, as the creature hits the bottom of the scene as shown at 126-3, its arms, legs, and antenna again move and then wobble to different degrees as indicated by the varying lines at 332, 334, and 336.

For example, the physical properties may have specified that the legs are highly damped, so not much wobble or vibration occurs with respect to joint J3 when the creature reaches 126-3. However, the legs have mass and so, when joint J3 is accelerated upward, the bones of the alien's legs rotate about J3 and move together and then come apart when J3 is accelerated downward. On the other hand, joints J1 and J2 may be lightly damped, so a high amount of vibration is shown at 334. The creature's antennae are represented using articulated joints, so the wobble may depend on the parameters for joints J1, J2, J4, and J5. For instance, the ends of the antennae may be specified as having a high weight, so even if joints J4 and J5 are highly damped, oscillation of the articulated structures about J1 and J2 may nonetheless occur, with little oscillation of the antennae upper portions as compared to the lower portions.

This example discussed a runtime application package executed in a runtime environment. It will be understood that the present subject matter can be applied regardless of the particular form of the runtime package. For instance, the runtime package may comprise a compiled application. As another example, the runtime package may comprise code and/or script to be interpreted (e.g., HTML code with JAVASCRIPT to be interpreted by a browser). For instance, the object elements could be specified for rendering in an HTML5 "canvas," with suitable scripting generated to implement the inverse kinematics model, physics engine, and to include appropriate input handlers to respond to mouse and other input events.

Figure 4:
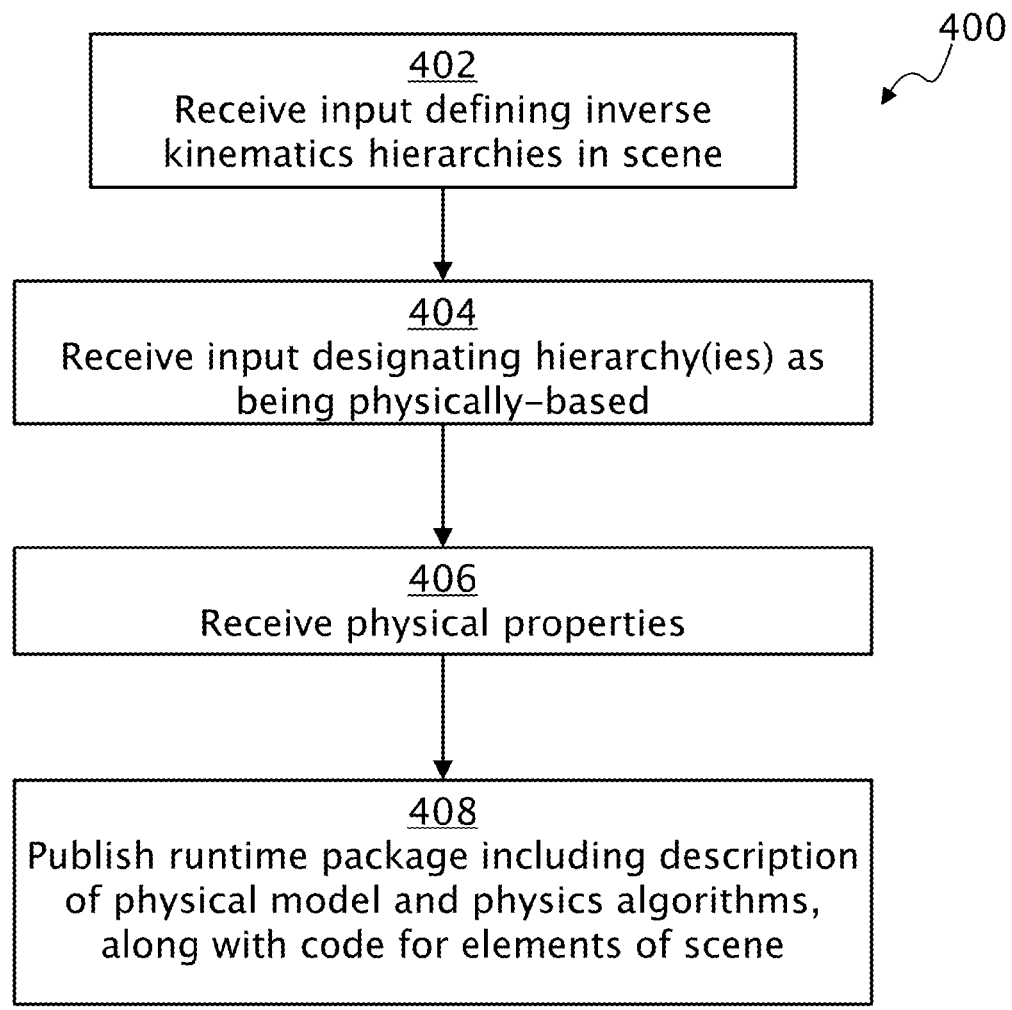
FIG. 4 is a flowchart illustrating steps in an exemplary computer-implemented method 400 for defining physically-based effects to be provided at runtime according to an inverse kinematics model.

FIG. 4 is a flowchart illustrating steps in an exemplary computer-implemented method 400 for defining physically-based effects to be provided at runtime according to an inverse kinematics model. For example, method 400 may be carried out by development application 112 of FIG. 1.

Block 402 represents receiving input defining inverse kinematics hierarchies in a scene. For example, as noted above the development application may provide a design canvas in which a user can define one or more objects making up a scene. The object(s) may be grouped into logical units by specifying bones and joints of an inverse kinematics hierarchy. As a particular example, the arms, legs, antenna, and other features of creature 126 of the foregoing example may be linked to corresponding bones and joints to form an inverse kinematics hierarchy for the entire creature.

Block 404 represents receiving input designating one or more of the hierarchies as being physically-based. For example, a user may right-click or select a menu or toolbar option while designating an inverse kinematics hierarchy. In response, at block 406 the development application presents an interface to receive physical properties. The physical properties define how the bones and joints should be treated in the physical model. For example, mass properties, volume, density, and other characteristics of bones (or entire hierarchies) can be provided, along with properties such as spring constants, damping, and other parameters influencing how portions of the hierarchy interact with one another (e.g., how two bones behave when coupled at a joint).

Block 408 represents publishing a runtime application package. For instance, the designer may provide other input, such as specifying background elements, other interface elements, a timeline, and the like that define how scenes are to be rendered and otherwise indicating what is to occur when the application is executed. The publishing process includes generating code and data in a suitable format so that, when executed (or interpreted), the code and data can be used to render the scene or scenes as defined at design time.

In accordance with the present subject matter, block 408 also includes a description of the physical model based on the received physical properties and including code executable to provide physics-based responses at runtime. For example, an XML-based description of the physical model, along with the code comprising the physics algorithms, can be packaged and embedded into the SWF or other file(s) representing the runtime application package. The physics algorithms can be integrated to calculate forces to apply to portions of the inverse kinematics model in response to other forces applied to the model (i.e. forces as the result of user input and/or other movement of modeled objects).

Figure 5:
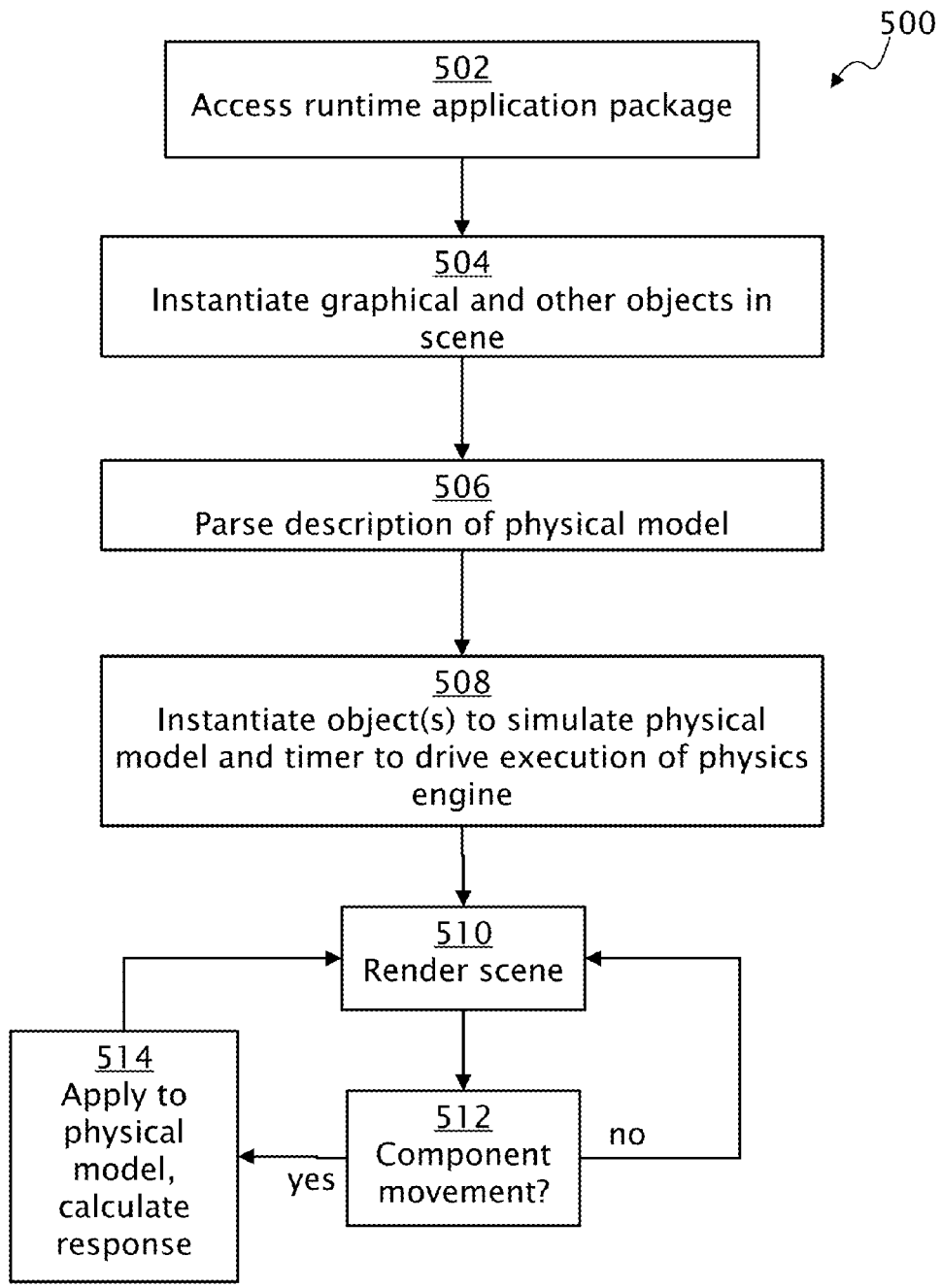
FIG. 5 is a flowchart illustrating steps of an illustrative method of using a runtime application package.

FIG. 5 shows steps of an illustrative method 500 carried out in response to receipt of such a runtime application package. The method begins at block 502, which represents accessing the runtime application package. For example, a runtime environment such as FLASH(R) or AIR(R) may carry out the steps of FIG. 5 when the computing device executing the runtime environment downloads or accesses a SWF or other file from memory. However, as noted above the runtime package may be specified in any suitable form.

Block 504 represents parsing the file and instantiating graphical and other objects in the scene. For example, based on the contents of the runtime application package, the runtime environment can create in-memory representations of the various objects for use in rendering the scene. Functional code can be loaded into memory to control the behavior of the objects and the application (e.g., to move between scenes, respond to input, etc.).

Block 506 represents parsing the description of the physical model, and block 508 represents instantiating objects to simulate the physical model during runtime, along with a timer to drive execution of the physics engine. As was noted above, a development application can include an XML or other description of the physical model for use in providing physical effects at runtime, along with suitable code to actually create the physical effects. Thus, when the application is loaded, the code is used to create a physics engine that provides responses based on the parameters. For example, the physics engine can include algorithms that use physical parameters such as volume, density, and the like to simulate object motion in accordance with Newton's laws of motion. Of course, fanciful laws of motion could be modeled instead. The timer can be used as part of the physics engine—i.e., to provide a base for calculating input velocities and forces and for providing output effects over time.

Block 510 represents rendering one or more scenes according to the runtime application. For example, the object(s) can be rendered based on in-memory representations defining the objects' appearance, location, and relationship. Rendering may involve a number of operations, and can include responding to inputs such as changes to other scenes, textual or other input, and the like.

Block 512 represents, during rendering, determining if a component is moved or otherwise subjected to a force. If not, flow moves to block 510, in which the scene is rendered normally. If at block 512 a force is applied or a component is otherwise moved, then flow moves to block 514. Block 514 represents applying an input to the physical model and calculating an appropriate response. Thus, the physics engine can be used to provide a feedback loop that results in realistic physical responses without the need for the designer to expressly script those responses. The time step for traversing the loop can be set at an appropriate value to provide a realistic response without overwhelming the computing capability of the device.

The force that is applied may result from user input or may result from an event that is included in the program, such as a previously-scripted movement of the object. As an example of user input, the user may click on a portion of an object and move the mouse, such as clicking an antenna of creature 126 and dragging downward. Such mouse movements can be interpreted as force vectors of a given direction and magnitude. For example, a force value can be based on the distance covered during the mouse movement as timed using the timer, using either an assumed weight for the pointer or a weight specified in the physical model for the application. The physics engine can take those applied forces and calculate restoring torques or other responses at the joints defined in the inverse kinematics model. For instance, a force applied to antenna 132-U can be calculated for its impact on bones 146 and 144 as mediated by joints J4 and J1. As an example, a restoring torque can be calculated and used to move the corresponding portions of alien 126 (in this example, antenna portions 132-U and 132-L), resulting in a lifelike springy behavior of the IK model. Depending, of course, on the parameters of the inverse kinematics model, numerous portions could be affected.

As noted above, the forces may result from pre-programmed movement of the object. For instance, the left-to-right movement of alien 126 as illustrated in FIG. 3 may be specified in the authoring tool and can be implemented as a scripted movement of one or more portions of alien 126. For example, the scripted portion may move feet 138 upward and rightward and then rightward and downward. According to the inverse kinematics model, this movement will apply force via the linked joints to move the entire alien upward. Based on the physical parameters of the bones and joints, the forces will result in movement as illustrated at 326, 328, and 330, including a "jolt" when the collision with the scene edge is simulated with an abrupt stop (alternatively, the scene edge may have a physical presence). Then, the downward movement will result in additional forces and another jolt when the position shown at 126-3 is reached. At that point, the alien's arms, legs, and antennae will vibrate according to the damping and other parameters specified in the physical model.

General Considerations

Some portions of the detailed description were presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here and generally is considered to be a self-consistent sequence of operations or similar processing leading to a desired result. In this context, operations or processing involve physical manipulation of physical quantities.

Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels.

Unless specifically stated otherwise, as apparent from the foregoing discussion, it is appreciated that throughout this specification discussions utilizing terms such as "processing," "computing," "calculating," "determining" or the like refer to actions or processes of a computing platform, such as one or more computers and/or a similar electronic computing device or devices, that manipulate or transform data represented as physical electronic or magnetic quantities within memories, registers, or other information storage devices, transmission devices, or display devices of the computing platform.

The various systems discussed herein are not limited to any particular hardware architecture or configuration. A computing device can include any suitable arrangement of components that provide a result conditioned on one or more inputs. Suitable computing devices include multipurpose microprocessor-based computer systems accessing stored software, that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

A computing device may access one or more computer-readable media that tangibly embody computer-readable instructions which, when executed by at least one computer, cause the at least one computer to implement one or more embodiments of the present subject matter. When software is utilized, the software may comprise one or more components, processes, and/or applications. Additionally or alternatively to software, the computing device(s) may comprise circuitry that renders the device(s) operative to implement one or more of the methods of the present subject matter.

Examples of computing devices include, but are not limited to, servers, personal computers, mobile devices (e.g., tablets, smartphones, personal digital assistants (PDAs), etc.) televisions, television set-top boxes, portable music players, and consumer electronic devices such as cameras, camcorders, and mobile devices. Computing devices may be integrated into other devices, e.g. "smart" appliances, automobiles, kiosks, and the like.

Embodiments of the methods disclosed herein may be performed in the operation of computing devices. The order of the blocks presented in the examples above can be varied—for example, blocks can be re-ordered, combined, and/or broken into sub-blocks. Certain blocks or processes can be performed in parallel.

Any suitable non-transitory computer-readable medium or media may be used to implement or practice the presently-disclosed subject matter, including, but not limited to, diskettes, drives, magnetic-based storage media, optical storage media (e.g., CD-ROMS, DVD-ROMS, and variants thereof), flash, RAM, ROM, and other memory devices.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing may readily produce alterations to, variations of, and equivalents to such embodiments. Accordingly, it should be understood that the present disclosure has been presented for purposes of example rather than limitation, and does not preclude inclusion of such modifications, variations and/or additions to the present subject matter as would be readily apparent to one of ordinary skill in the art.

What is claimed:

1. A method comprising:
   defining an inverse kinematics hierarchy for an object in an application under development by a developer;
   providing a user interface to the developer for receiving input indicating a physical parameter for the inverse kinematics hierarchy for the object, the input received from the developer via the user interface used to configure runtime physics-based behaviors of the inverse kinematics hierarchy in the application under development without requiring the developer to expressly create scripting code to support the physics-based behaviors;
   compiling, via a processor, the application under development into a compiled application for execution in a runtime environment; and
   producing, via the processor, a package comprising the compiled application, wherein the compiled application includes:
   a description of the physical parameter for the inverse kinematics hierarchy for the object; and
   code that, when executed in the runtime environment, provides a physics engine configured to calculate a physical response of at least a portion of the inverse kinematics hierarchy of the object using the description of the physical parameter.

2. The method of claim 1 wherein the package comprises:
   a scene description identifying the object to be rendered in a scene; and
   code that moves the object from an initial position within the scene;
   wherein the physics engine is configured to calculate the physical response to the object moving from the initial position using the description of the physical parameter.

3. The method of claim 1 wherein the package comprises:
   a scene description identifying the object to be rendered in a scene; and
   code that moves the object from an initial position within the scene to collide with a top, bottom, or side of the scene;
   wherein the physics engine is configured to calculate the physical response to the object colliding with the top, bottom, or side of the scene using the description of the physical parameter.

4. The method of claim 1 wherein the package comprises:
   a scene description identifying the object to be rendered in a scene; and
   code that receives input moving the object within the scene;
   wherein the physics engine is configured to calculate the physical response to the object moving within the scene in response to the input, the physical response calculated using the description of the physical parameter.

5. The method of claim 1 wherein the physical parameter is a mass or weight of a bone of the inverse kinematics hierarchy specified for the object.

6. The method of claim 1 wherein the physical parameter is a volume of a bone of the inverse kinematics hierarchy specified for the object.

7. The method of claim 1 wherein the physical parameter is a density of a bone of the inverse kinematics hierarchy specified for the object.

8. The method of claim 1 wherein the physical parameter is a spring constant that governs how bones of the inverse kinematics hierarchy specified for the object interact with one another.

9. The method of claim 8 wherein the physical parameter influences how two bones of the inverse kinematics hierarchy behave when coupled at a joint.

10. The method of claim 1 wherein the physical parameter is a damping parameter that governs how bones of the inverse kinematics hierarchy specified for the object interact with one another.

11. The method of claim 1 wherein the physical response responds to movement specified by input received at runtime of the package.

12. The method of claim 1 wherein the physical response responds to movement specified by an instruction within the package.

13. The method of claim 1 wherein the physics engine comprises an algorithm that uses the physical parameter to simulate motion of the object in accordance with Newton's laws of motion.

14. The method of claim 1 wherein the physics engine comprises an algorithm that uses the physical parameter to calculate input velocities and forces and for providing output effects over time.

15. The method of claim 1 wherein the physics engine is configured to be used in a feedback loop that results in responses to movement input without requiring that express scripting of the responses be included in or used in creating the package.

16. The method of claim 1, wherein the physical response is calculated by the physics engine based at least in part upon the input received via the user interface.

17. The method of claim 1, wherein the user interface is a graphical user interface in which the input for the physical parameter is received, the physical parameter comprising at least one of: a spring constant and a damping property.

18. The method of claim 1, further comprising:
providing an option for the developer to indicate that the application under development is to support runtime physically-based behaviors for inverse kinematics hierarchies;
receiving a selection of the option; and
based on receiving the selection of the option, providing the user interface for receiving the input indicating the physical parameter for the inverse kinematics hierarchy for the object.

19. A system comprising:
a processor for executing instructions stored in a non-transitory, computer-readable medium on one or more devices to perform operations, the operations comprising:
receiving data defining an inverse kinematics hierarchy for an object in an application under development by a developer;
providing a user interface to the developer for receiving input indicating a physical parameter for the inverse kinematics hierarchy for the object, the input received from the developer via the user interface used to configure runtime physics-based behaviors of the inverse kinematics hierarchy in the application under development without requiring the developer to expressly create scripting code to support the physics-based behaviors;
compiling the application under development into a compiled application for execution in a runtime environment; and
producing a package comprising the compiled application, wherein the compiled application comprises:
a description of the physical parameter for the inverse kinematics hierarchy for the object; and
code that, when executed in the runtime environment, provides a physics engine configured to calculate a physical response of at least a portion of the inverse kinematics hierarchy of the object using the description of the physical parameter.

20. A computer program product comprising a non-transitory, computer-readable medium embodying program code executable by a processor, the program code comprising: code for receiving data defining an inverse kinematics hierarchy for an object in an application under development by a developer; code for providing a user interface to the developer for receiving input indicating a physical parameter for the inverse kinematics hierarchy for the object, the input received from the developer via the user interface used to configure runtime physics-based behaviors of the inverse kinematics hierarchy in the application under development without requiring the developer to expressly create scripting code to support the physics-based behaviors; code for compiling the application under development into a compiled application for execution in a runtime environment; and code for producing a package comprising the compiled application, wherein the compiled application comprises: a description of the physical parameter for the inverse kinematics hierarchy for the object; and code that, when executed in the runtime environment, provides a physics engine configured to calculate a physical response of at least a portion of the inverse kinematics hierarchy of the object using the description of the physical parameter to influence how the object is displayed when the application is executed.

* * * * *